(12) United States Patent
Von Hippel et al.

(10) Patent No.: US 7,429,370 B2
(45) Date of Patent: Sep. 30, 2008

(54) PROCESS FOR THE PRODUCTION OF HYDROGEN CYANIDE BY THE BMA PROCESS AND CATALYST FOR THE IMPLEMENTATION THEREFOR

(75) Inventors: Lukas Von Hippel, Alzenau (DE); Robert Weber, Euskirchen (DE); Martin Bewersdorf, Gelnhausen (DE); Ernst Gail, Egelsbach (DE); Helmut Schwarz, Berlin (DE)

(73) Assignee: Degussa AG, Düsseldorf (DE)

( * ) Notice: Subject to any disclaimer, the term of this patent is extended or adjusted under 35 U.S.C. 154(b) by 66 days.

(21) Appl. No.: 10/542,215

(22) PCT Filed: Feb. 18, 2004

(86) PCT No.: PCT/EP2004/001516

§ 371 (c)(1), (2), (4) Date: May 22, 2006

(87) PCT Pub. No.: WO2004/076351

PCT Pub. Date: Sep. 10, 2004

(65) Prior Publication Data

US 2006/0257308 A1 Nov. 16, 2006

(30) Foreign Application Priority Data

Feb. 28, 2003 (DE) .................. 103 09 209

(51) Int. Cl.
*C01C 3/02* (2006.01)
*B01J 27/24* (2006.01)
*B01J 23/50* (2006.01)
*B01J 23/52* (2006.01)
*B01J 23/72* (2006.01)
*B01J 23/888* (2006.01)

(52) U.S. Cl. ........................ 423/376; 502/200; 502/313; 502/330; 502/331

(58) Field of Classification Search ................. 423/376; 502/200, 330, 331, 313
See application file for complete search history.

(56) References Cited

U.S. PATENT DOCUMENTS

| 1,934,838 | A | * | 11/1933 | Andrussow | 423/376 |
|---|---|---|---|---|---|
| 2,006,981 | A | * | 7/1935 | Andrussow | 423/376 |
| 2,105,831 | A | * | 1/1938 | Andrussow | 423/376 |
| 2,866,692 | A | * | 12/1958 | Leitenberger et al. | 422/222 |
| 3,104,945 | A | * | 9/1963 | Jenks et al. | 423/376 |
| 3,658,471 | A | | 4/1972 | Sperka et al. | |
| 4,107,278 | A | * | 8/1978 | Wang | 423/376 |
| 4,961,914 | A | * | 10/1990 | Witzel et al. | 423/376 |
| 5,039,643 | A | * | 8/1991 | Hecht et al. | 502/200 |
| 5,262,145 | A | * | 11/1993 | Agrawal et al. | 423/372 |
| 5,767,036 | A | * | 6/1998 | Freund et al. | 502/185 |
| 5,928,984 | A | * | 7/1999 | von Hippel et al. | 502/200 |
| 5,935,897 | A | * | 8/1999 | Trubenbach et al. | 502/172 |
| 5,935,898 | A | * | 8/1999 | Trubenbach et al. | 502/300 |
| 6,048,512 | A | * | 4/2000 | von Hippel et al. | 423/376 |
| 2002/0031455 | A1 | * | 3/2002 | Hippel et al. | 422/173 |
| 2005/0271572 | A1 | * | 12/2005 | Benderly | 423/376 |
| 2007/0123744 | A1 | * | 5/2007 | Basini et al. | 585/658 |

FOREIGN PATENT DOCUMENTS

| DE | 919 769 | 11/1954 |
|---|---|---|
| DE | 1 013 636 | 8/1957 |
| DE | 1 933 240 | 7/1970 |
| EP | 0 299 174 | 1/1989 |
| EP | 0 407 809 | 1/1991 |
| GB | 958784 | 5/1964 |

* cited by examiner

*Primary Examiner*—Wayne Langel
(74) *Attorney, Agent, or Firm*—Robert G. Weilacher; Smith, Gambrell & Russell

(57) ABSTRACT

The invention relates to an improvement to the BMA process for the production of hydrogen cyanide from methane and ammonia in the presence of a platinum-containing catalyst. The problem of sooting, and thus the decrease in activity, of the catalysts can be reduced, or the activity increased, in that the catalyst is doped with an element from the series Cu, Ag, Au, Pd and W. The doping is preferably in the range of 0.01 to 20 mole % doping element, based on Pt.

9 Claims, No Drawings

PROCESS FOR THE PRODUCTION OF HYDROGEN CYANIDE BY THE BMA PROCESS AND CATALYST FOR THE IMPLEMENTATION THEREFOR

The invention relates to a process for the production of hydrogen cyanide by the so-called BMA process, wherein an aliphatic hydrocarbon with 1 to 4 C atoms is reacted with ammonia in the presence of a platinum-containing catalyst at 1000 to 1350° C. and hydrogen cyanide is separated out of the reaction gas.

The invention further relates to a catalyst for the implementation of the process, with which sooting problems can be reduced and/or the production capacity can be increased through increased catalyst activity.

The BMA process for the production of hydrogen cyanide is known per se—see Ullmann's Encyclopedia [sic] of Industrial Chemistry, $5^{th}$ Rev. Ed. [sic] 1987, vol. A8, pages 162-163.

In an effort to increase the yield of hydrogen cyanide and the service life of the catalysts used, various catalyst systems have been investigated. In the process according to DE-AS 10 13 636, catalysts are employed which, in addition to one or more platinum metals, contain aluminium and/or magnesium in metallic form or as a nitride. No indications as to which platinum metals should be combined with one another to obtain some advantage compared with the sole use of platinum in combination with the base metals mentioned can be taken from this document.

In the process according to EP 0 299 175 B1 an aliphatic hydrocarbon with 1 to 4 carbon atoms, particularly methane, is reacted with ammonia in the presence of a catalyst layer located on a shaped article. The catalyst layer was obtained by impregnating the shaped article with a solution containing platinum ions and aluminium ions and heating under reducing conditions. Although these processes made it possible to reduce the regeneration cycles needed to restore full catalyst activity, the problem of sooting, which is known per se and which leads to a reduction in catalyst activity and thus a fall in production capacity, is not adequately overcome.

The problem of sooting of the catalyst in the BMA process is also addressed in DE Offenlegungsschrift 19 33 240. To reduce the fsooting tendency, a catalyst is employed which comprises a coating of platinum, which can optionally be alloyed with up to 20 mole % of another metal, on calcined mullite as support. There is no disclosure as to which other alloying constituents could be involved here.

From EP 0 407 809 B1 a process for the production of catalytically active coatings on the surface of shaped articles consisting of aluminium oxide is known for hydrogen cyanide production by the BMA process. For the coating, a suspension containing particulate elemental platinum metal and particulate elemental aluminium in an atomic ratio of Pt:Al of 0.001 to 1 is employed. The suspension, with the carrier liquid preferably comprising organic solvents, can additionally contain adhesive oxides or precursors thereof, such as poly(organoalkoxysiloxanes). The catalytically active coating contains, in addition to the platinum metal, aluminium and/or aluminium nitride formed therefrom. Compounds such as can be formed by the interaction of the above substances with the reactants used in the process, including Pt—Al alloys, may also be present. Although other platinum metals, including palladium, and mixtures of platinum metals can be used as well as platinum, no specific advantage for a particular combination of substances can be taken from this document. As well as the at least one platinum metal and aluminium, the suspension can additionally contain one or more other catalytically active metals or metal compounds capable of being reduced to these metals. Copper is also mentioned here as being catalytically active. No indication can be taken from this document as to why and in what quantity a person skilled in the art should use copper to modify platinum in order to achieve an advantage compared with platinum alone.

While it is true that the above-mentioned EP patent teaches how coatings of different coat thicknesses can be produced on a shaped article, there is no indication of what measure could be used to reduce the sooting problem and/or to increase the catalyst activity and thus the production capacity that can be achieved.

The mechanism of $Pt^+$-mediated C—N linkage was investigated by Schwarz and colleagues using the example of HCN synthesis from methane and ammonia—J. Am. Chem. Soc. 1999, 121, 10614 to 10625. It follows from this investigation that, compared with other transition metal cations, including $Fe^+$, $Co^+$, $Rh^+$, $W^+$, $Os^+$, $Ir^+$ and $Au^+$, $Pt^+$ occupies a special position with respect to the ability to activate methane and mediate the C—N linkage. In contrast to platinum, gold is not capable of activating methane, i.e. of performing the first step of a carbene formation ($AuCH^{2+}$). On the other hand, an $AuCH^{2+}$ obtained by other means can react with ammonia with the formation of $CH_2NH_2^+$ and subsequently form hydrogen cyanide. The problem of sooting is not addressed in this investigation.

Even if it were possible to reduce the problem of catalyst sooting in the BMA process by using a catalyst e.g. according to EP 0 299 174 B1 or EP 0 407 809 B1, a certain soot formation does nevertheless occur on the catalyst surface in continuous operation—in practice the catalyst is located on the inside of contact tubes, e.g. made of aluminium oxide. The soot formation—the term soot below includes all carbon-containing deposits on the catalyst—leads to losses of efficiency and therefore makes certain counter-measures necessary. To reduce soot formation or to treat a deactivation that has already occurred due to soot formation, the molar ratio of ammonia to methane used can, for example, be increased more markedly or the reactor can be operated periodically with ammonia only. However, these counter-measures mean that a larger quantity of ammonia has to be separated out of the reaction gas, resulting in increased process costs. According to another alternative for reducing the soot problem, the contact tubes can be mechanically cleaned periodically, but this is time-consuming and therefore leads to a reduction in plant availability and thus capacity.

The object of the present invention is thus to provide an improved process for the production of hydrogen cyanide by the BMA process. The improvement relates on the one hand to reducing the sooting tendency of the catalyst and thus increasing the plant capacity. As an alternative or in addition to this, the sooting tendency of the catalyst to be employed in the new process can vary within the conventional framework if, at the same time, the catalyst displays higher activity so that an increase in the capacity of a plant is again achieved.

The above objects, as well as other objects as can be derived from the following description, can be achieved by employing a platinum catalyst, which is doped with other elements in a certain way.

A process has been found for the production of hydrogen cyanide by the so-called BMA process, wherein an aliphatic. hydrocarbon with 1 to 4 C atoms is reacted with ammonia in the presence of a platinum-containing catalyst at 1000 to 1350° C. and hydrogen cyanide is separated out of the reaction gas formed, characterised in that the platinum of the catalyst is doped with at least one element from the series copper, silver, gold, palladium and tungsten, the quantity of Cu and Pd being up to 30 mole %, based on Pt.

The subclaims of the process relate to preferred embodiments thereof.

As can be seen from the prior art evaluated above, it is true that palladium and copper have been mentioned as components of a platinum-containing catalyst for the BMA process, but there has been no mention of the quantity in which these elements are to be used and of what is the intended purpose of their use. In the process according to the invention, copper and palladium are employed in a quantity of up to 30 mole %, based on platinum. Unpredictably, by doping platinum with palladium, used in a quantity preferably in the range of 0.1 to 20 mole %, based on Pt, it was possible both to reduce soot formation and to increase catalytic activity. By doping platinum with copper, the sooting tendency can be reduced, but with respect to the catalyst activity it is useful to limit the quantity of copper used to about 10 mole %, based on platinum.

For the purpose of reducing the sooting tendency and/or increasing the catalyst activity, the elements gold, silver and tungsten are preferably used for the doping in a quantity in the range of 0.01 to 50 mole %, particularly 0.1 to 30 mole %, based on platinum.

With respect to reducing the sooting tendency, silver occupies an outstanding position. As can be seen from the examples, when platinum is doped with 10 mole % silver, the soot deposits can be reduced by up to 65%.

The sooting tendency of a platinum catalyst doped with gold corresponds approximately to that of the pure platinum catalyst when the level of gold doping is low; as the gold content increases, however, the sooting tendency decreases. On the other hand, gold as a doping element is unexpectedly distinguished by the fact that the catalyst activity increases significantly. By using a catalyst doped e.g. with 10 mole % gold, based on platinum, the plant output can thus be increased although the soot formation is not reduced or is not significantly reduced. The result of doping with gold is particularly surprising because, as shown by the investigations by Schwarz et al. evaluated above, gold alone is not capable of activating methane.

According to a preferred embodiment of the process according to the invention, the catalyst additionally contains aluminium or magnesium in elemental or nitride form, particularly aluminium nitride.

The catalyst is conventionally arranged as a coating on a support material consisting of an oxide or nitride ceramic material, particularly aluminium oxide. The support material is, in practice, ceramic tubes, which are heated from the outside and in the interior of which the reaction takes place. To guarantee adequate adhesive strength of the catalyst coating on the support material, it is useful if the catalyst layer is fixed on the support material by means of one or more oxide or silicate adhesives. A particularly preferred, known embodiment of a coating composition, which also contains suitable precursors of adhesive oxides, is taught by the EP Patent 0 407 809 B1, the disclosure of which is fully incorporated into the present description. The catalyst layers to be used according to the invention can be obtained from the compositions mentioned in EP 0 407 809 B1 in that part of the platinum is replaced by one or more doping elements according to the invention, or in that a doping element is additionally used with the same quantity of Pt.

According to a particularly preferred embodiment, the BMA process is performed in the presence of a catalyst coating arranged on a shaped article consisting substantially of aluminium oxide. The catalyst coating is obtainable by applying a suspension on to the shaped article, said suspension containing, in addition to particulate elemental platinum, particulate aluminium or aluminium nitride and at least one doping element from the series copper, silver, gold, tungsten and palladium or a compound of these elements and a precursor of an oxide or silicate adhesive in a preferably organic carrier liquid. The atomic ratio of platinum to aluminium is in the range of 0.01 to 10 and the molar ratio of platinum to doping element(s) is at least 1:0.001 and preferably 1:0.01 to 1:0.2. After the shaped articles have been coated with a suspension of this type, which can additionally contain auxiliary substances to adjust the rheological behaviour, the coating is transferred into the catalytically active state by heating in the presence of ammonia or nitrogen, i.e. under reducing conditions, to 1000 to 1350° C.

The present invention also provides the catalyst to be used according to the invention, which is characterised in that it contains at least one doping element from the series copper, silver, gold, tungsten and palladium, the content of Pd and Cu being up to 20 mole %, based on Pt. Other components of the catalyst are aluminium nitride and/or a platinum-aluminium alloy, it being possible for these components to be employed during the catalyst production or to be formed in situ from platinum and aluminium under the conditions of the BMA process.

A preferred catalyst is in the form of a catalyst coating arranged on a shaped article consisting of an oxide or nitride ceramic material, which adheres firmly to the shaped article by means of an oxide or silicate adhesive. The catalyst or catalyst coating can be produced by a method that is known per se, the quantitative ratio according to the invention of platinum and doping element(s) being used.

The advantages of the invention substantially consist in the fact that, by the selection according to the invention of one or more doping elements, it was possible to reduce the problem of sooting in the BMA process. According to preferred embodiments, particularly therefore a doping of platinum with gold and also, to some extent, a doping of platinum with palladium, it was additionally possible to increase catalyst activity significantly. As a result of the measures according to the invention it has become possible for the availability of a BMA production plant to be prolonged and thus for the production capacity to be increased.

The invention is explained further by means of the following examples.

EXAMPLES

General:

The catalyst metals from the series Pt, Cu, Ag, Au, Pd and W were incorporated into a lacquer (=coating suspension), in which platinum was completely or partially replaced by metals to be investigated. The composition of the lacquer substantially corresponded to that of Example 6 of EP 0 407 809 B1. The lacquer for the reference examples consisted of:

7 g platinum
10.0 g Al powder ($d_{50}$ approx. 11 μm)
3.5 g phenylethyl polysiloxane (oligomer)
0.3 g pyrogenic silica (Aerosil® 300, Degussa)
10.0 g poly(methyl/butyl) methacrylate as 40% mixture in toluene
40 ml toluene A sufficient quantity of the above lacquer was introduced into the tube so that, after drying (substantially toluene loss), approx. 1 g of dried catalyst paste is located evenly on the inner surface of the tube stated below.

In each case, 5 tubes were coated (length 40 cm, $d_i$ 8 mm). After activating the catalyst by heating under $N_2$ at 1300° C., a methane/ammonia feed mixture was passed through the tubes arranged in a laboratory reactor at 1300° C. (internal oven temperature) for 5 h. The reaction gas mixture was selectively analysed from each tube. In order to be able to investigate the sooting with a practicable test duration, the molar ratio used was adjusted to 0.7 mol/h $NH_3$ and 1.0 mol/h $CH_4$ compared with the standard (approx. 10 mole % $NH_3$ excess). The soot formation was determined gravimetrically. Any modifications may be taken from the following examples.

The laboratory oven was equipped with 5 tubes in each case, with one tube containing a coating with the basic platinum formulation for comparison purposes (internal standard). The feed of the gas mixture ($NH_3+CH_4$) was identical in all the tubes. The firing of all the tubes was uniform because of the oven design.

Examples 1 to 5

For comparison purposes, the catalyst elements Pt, Ag, Cu, Au, W and Pd were each investigated individually. In the basic formulation, Pt was replaced by the other elements. Average values for the increase in weight (=sooting) of the tubes can be taken from the following table.

| Ex. no. | Catalyst element | Weight increase (mg) |
| --- | --- | --- |
| 1 | Pt | 150 |
| 2 | Pd | 250 |
| 3 | Cu | 1100 |
| 4 | Ag | 3400 |
| 5 | Au | 3100 |
| 6 | W | 2050 |

The suitability of these metals for HCN formation decreases in approximately the same order as the sooting tendency increases.

Examples 7 to 12

Catalyst coatings were investigated in which platinum was the primary catalyst metal and, compared with the general formulation, 10 mole % Pt was replaced by the doping element mentioned. The reference sample contained only Pt, i.e. no doping element.

The results of a $1^{st}$ test run may be taken from the following table.

After the $1^{st}$ test run, the tubes were mechanically freed from adhering soot by known means. The $2^{nd}$ test run was then performed.

| | | Weight increase (mg) | |
| --- | --- | --- | --- |
| Example | Doping element | $1^{st}$ test run | $2^{nd}$ test run |
| 7 | Reference (Pt) | 550 | 150 |
| 8 | Cu | 600 | 90 |
| 9 | Ag | 440 | 20 |
| 10 | Au | 640 | 50 |
| 11 | W | 330 | 40 |
| 12 | Pd | 370 | 70 |

While the soot formation was relatively strongly marked in the first test run, the second test run shows the reduction in soot formation resulting from the doping according to the invention even more clearly.

In addition to the quantity of soot formed, the product gas composition was analysed at the beginning of the $1^{st}$ test run, i.e. before the catalyst surface was impaired by sooting.

The volume concentration of HCN in the reaction gas given in the following table may be mentioned as a measure of the catalyst activity, since the operating conditions were constant and a reference sample was always running at the same time.

| Example No. | Doping element | % HCN by volume in the reaction gas |
| --- | --- | --- |
| 7 | Reference (Pt) | 15.1 |
| 8 | Cu | 13.8 |
| 9 | Ag | 14.9 |
| 10 | Au | 17.0 |
| 11 | W | 14.0 |
| 12 | Pd | 16.3 |

Examples 13 to 16

Doping elements were added to the formulation mentioned at the beginning; the Pt content remained unchanged. The testing was performed under conditions that were otherwise conventional. The results may be taken from the following table.

| Example No. | Doping element; amount used (mole % based on Pt) | Weight increase (mg) |
| --- | --- | --- |
| 13 | Reference (Pt) | 280 |
| 14 | Ag; 10% | 100 |
| 15 | Cu; 10% | 200 |
| 16 | Au; 10% | 290 |

The invention claimed is:

1. A process for the production of hydrogen cyanide by the BMA process, wherein an aliphatic hydrocarbon with from 1 to 4 carbon atoms is reacted with ammonia in the presence of a platinum-containing catalyst at 1000° C. to 1350° C. and hydrogen cyanide is separated from the reaction gas formed and wherein the platinum of the catalyst is doped with at least one element selected from the group consisting of copper, silver, gold, and tungsten, the quantity of copper when present being not more than 30 mole %, based on platinum.

2. The process of claim 1, wherein said platinum is doped with 0.01 to 50 mole % of an element selected from the group consisting of silver, gold and tungsten.

3. The process of claim 1, wherein said catalyst additionally comprises aluminum or magnesium in elemental or nitride form.

4. The process of claim 3, wherein said catalyst comprises aluminum oxide.

5. The process of claim 1, wherein said catalyst comprises a support material consisting of an oxide or nitride ceramic material.

6. The process of claim 5, wherein said support material is aluminum oxide.

7. The process of claim 1, wherein said catalyst comprises a coating on a shaped article consisting essentially of aluminum oxide, said coating being fixed on said shaped article by an oxide or silicate adhesive, wherein said coating comprises as its main components: platinum, doped with gold and/or silver; and aluminum in the form of aluminum nitride and/or a platinum-aluminum alloy.

8. The process of claim 7, wherein said shaped article is a reaction tube and said coating is fixed on the inside of said reaction tube.

9. The process of claim 1, wherein said catalyst is prepared by the steps comprising:
  a) applying a suspension comprising particulate elemental platinum; particulate aluminum or aluminum nitride; at least one particulate doping agent selected from the group consisting of copper, silver, gold, tungsten, palladium and compounds of these elements; a precursor of an oxide or silicate adhesive; and a carrier liquid onto a shaped article consisting essentially of aluminum oxide,
  b) evaporating the carrier liquid and
  c) heating the shaped article coated in this way to a temperature of from 1000° C. to 1350° C.
  and wherein the atomic ratio of Pt to Al is from 0.01 to 10 and the molar ratio of Pt to doping elements is at least 1:0.001.

* * * * *